United States Patent
Tamura

(10) Patent No.: US 9,531,912 B2
(45) Date of Patent: Dec. 27, 2016

(54) IMAGE PROCESSING APPARATUS AND IMAGE PROCESSING METHOD

(71) Applicant: CANON KABUSHIKI KAISHA, Tokyo (JP)

(72) Inventor: Hirokazu Tamura, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/715,313

(22) Filed: May 18, 2015

(65) Prior Publication Data
US 2015/0365562 A1   Dec. 17, 2015

(30) Foreign Application Priority Data
Jun. 11, 2014   (JP) .................. 2014-120791

(51) Int. Cl.
*H04N 1/04*   (2006.01)
*H04N 1/40*   (2006.01)
*H04N 1/403*   (2006.01)

(52) U.S. Cl.
CPC ............... *H04N 1/40* (2013.01); *H04N 1/403* (2013.01)

(58) Field of Classification Search
CPC .... G06T 11/001; G06T 3/4007; G06T 3/4015; G06T 3/403; G06T 7/408; G06T 2207/10024
USPC ........ 358/1.9, 504, 453, 474, 516, 518, 519, 358/520, 526; 382/167, 162, 274, 276, 382/165, 176, 232, 239, 243, 302, 305, 382/312; 348/E5.078, 223.1, E9.037, 348/9.051, 222.1, 242, 256, 272, 563, 348/603, 631, 649, 655
See application file for complete search history.

(56) References Cited

U.S. PATENT DOCUMENTS

| | | | |
|---|---|---|---|
| 5,489,989 A * | 2/1996 | Shimizu et al. | 358/401 |
| 5,689,620 A * | 11/1997 | Kopec et al. | 706/12 |
| 5,786,906 A * | 7/1998 | Shishizuka | G06T 7/408 358/500 |
| 6,753,976 B1 * | 6/2004 | Torpey et al. | 358/1.9 |
| 7,099,041 B1 * | 8/2006 | Moriya | H04N 1/40062 358/1.9 |
| 7,477,420 B2 * | 1/2009 | Friedman et al. | 358/1.9 |
| 8,270,046 B2 | 9/2012 | Tamura | |
| 8,274,710 B2 | 9/2012 | Yano et al. | |
| 8,379,269 B2 | 2/2013 | Kashibuchi et al. | |
| 8,531,683 B2 | 9/2013 | Tamura | |
| 8,548,204 B2 * | 10/2013 | Ikubo | 382/112 |
| 8,553,301 B2 | 10/2013 | Tamura | |

(Continued)

FOREIGN PATENT DOCUMENTS

| | | |
|---|---|---|
| EP | 0566300 A1 | 10/1993 |
| JP | 2004-320447 A | 11/2004 |

OTHER PUBLICATIONS

European Search Report dated Nov. 4, 2015 for counterpart European Patent Appn No. 15001520.4.

(Continued)

*Primary Examiner* — Negussie Worku

(74) *Attorney, Agent, or Firm* — Fitzpatrick, Cella, Harper & Scinto

(57) ABSTRACT

An image processing apparatus specifies pixels other than a white pixel which are included in a window, the window including a target pixel and pixels in the vicinity of the target pixel in a scanned image. Thereafter, the image processing apparatus averages color values of the specified pixels other than the white pixel, and then determines whether the target pixel is a color pixel based on a color value obtained by the averaging.

11 Claims, 16 Drawing Sheets

(56) References Cited

U.S. PATENT DOCUMENTS

| | | | |
|---|---|---|---|
| 8,599,646 B2* | 12/2013 | Pochon | G01S 7/023 367/99 |
| 8,625,892 B2* | 1/2014 | Nakamura | 382/167 |
| 8,660,347 B2 | 2/2014 | Tamura | |
| 8,810,856 B2* | 8/2014 | Suzuki | 358/2.1 |
| 8,823,726 B2* | 9/2014 | Pettigrew et al. | 345/589 |
| 9,087,274 B2* | 7/2015 | Kawabata et al. | |
| 2001/0035673 A1* | 11/2001 | Lepaule | 297/338 |
| 2003/0081831 A1* | 5/2003 | Fukao | H04N 1/6025 382/167 |
| 2003/0214661 A1* | 11/2003 | Kondo | H04N 1/6052 358/1.9 |
| 2004/0165081 A1* | 8/2004 | Shibaki et al. | 348/222.1 |
| 2004/0184672 A1* | 9/2004 | Murakami | G06T 5/002 382/274 |
| 2005/0180645 A1* | 8/2005 | Hasegawa et al. | 382/239 |
| 2006/0008140 A1* | 1/2006 | Imamura | G06K 9/34 382/164 |
| 2006/0050980 A1* | 3/2006 | Kohashi | G06T 5/002 382/254 |
| 2006/0222240 A1* | 10/2006 | Hirota | H04N 1/56 382/162 |
| 2008/0002230 A1 | 1/2008 | Sakaue | |
| 2008/0130025 A1* | 6/2008 | Yamamizu | H04N 1/00846 358/1.9 |
| 2008/0259359 A1* | 10/2008 | Tamura | 358/1.1 |
| 2008/0266432 A1* | 10/2008 | Tsuruoka | G06T 5/002 348/294 |
| 2009/0147314 A1* | 6/2009 | Matsuhira | H04N 1/409 358/2.1 |
| 2009/0161124 A1* | 6/2009 | Tamura | H04N 1/4095 358/1.1 |
| 2010/0202000 A1* | 8/2010 | Gotoh | H04N 1/46 358/1.9 |
| 2011/0228361 A1* | 9/2011 | Ohkawa | H04N 1/56 358/505 |
| 2012/0141149 A1* | 6/2012 | Ichikawa | G03G 15/556 399/27 |
| 2013/0343644 A1 | 12/2013 | Campbell | |

OTHER PUBLICATIONS

European Search Report dated Nov. 4, 2015 for counterpart European Application No. 15001520.4.

* cited by examiner

FIG.15A

| | 1 | 2 | 3 | 4 | 5 | 6 | 7 |
|---|---|---|---|---|---|---|---|
| | BACKGROUND | | | | | | |
| | BACKGROUND | | | NON-BACKGROUND | NON-BACKGROUND | | BACKGROUND |
| | | | NON-BACKGROUND | NON-BACKGROUND | | | |
| | | NON-BACKGROUND | NON-BACKGROUND | | | BACKGROUND | |
| | | | | | BACKGROUND | BACKGROUND | |

FIG.15B

| | 1 | 2 | 3 | 4 | 5 | 6 | 7 |
|---|---|---|---|---|---|---|---|
| | | | | NON-BACKGROUND | NON-BACKGROUND | | BACKGROUND |
| | BACKGROUND | NON-BACKGROUND | NON-BACKGROUND | NON-BACKGROUND | | | |
| | | NON-BACKGROUND | | | | BACKGROUND | |
| | | | | | BACKGROUND | | |

|   | 1 | 2 | 3 | 4 | 5 | 6 | 7 |
|---|---|---|---|---|---|---|---|
|   | 0 | 0 | 1 | 2 | 2 | 1 | 0 |
|   | 0 | 0 | 2 | 2 | 1 | 0 | 0 |
|   | 0 | 0 | 1 | 2 | 1 | 0 | 0 |

FIG. 16A

|   | 1 | 2 | 3 | 4 | 5 | 6 | 7 |
|---|---|---|---|---|---|---|---|
|   | 0 | 0 | 1 | 2 | 2 | 1 | 0 |
|   | 0 | 1 | 2 | 2 | 2 | 1 | 0 |
|   | 1 | 2 | 2 | 2 | 1 | 0 | 0 |

FIG. 16B

IMAGE PROCESSING APPARATUS AND IMAGE PROCESSING METHOD

BACKGROUND OF THE INVENTION

Field of the Invention

The present invention relates to an image processing apparatus and an image processing method for determining whether a document read by a reading device is a color document or a monochrome document.

Description of the Related Art

There is known a technique for determining whether a scanned image read by a reading device is a color image or a monochrome image (hereafter, referred to as color/monochrome determination technique).

In the color/monochrome determination technique, first, (1) determination is made on whether each of pixels in the scanned image is a color pixel or a monochrome pixel based on the saturation of the pixel. Then, (2) determination is made on whether the scanned image is a color image or a monochrome image based on determination results of the respective pixels in the entire scanned image.

In the determination of whether each pixel is a color pixel or a monochrome pixel, problems sometimes occur. For example, in a case where a sheet of a document is recycled paper containing impurities and the like, data of the scanned impurities may sometimes be determined to be color pixels. Moreover, false color and the like occurring in edge portions of monochrome contents due to color shift of the reading device may sometimes be determined to be color pixels. This determination method thus has a problem that, as a result of such erroneous determination, the document is erroneously determined to be a color document despite the fact that contents in the document are monochrome contents.

The color shift described above occurs because sensors of a scanner for R, G, and B catch reflection light from different positions on the document, respectively. Due to this, even in a case where a document including only black objects is scanned, pixels in which R, G, and B are not equal to one another are generated in edge portions of the black objects, and the document is determined to be a color document in some cases.

Moreover, in addition to the color shift, there is a case where accurate monochrome determination cannot be performed for pixels in a portion with a low saturation. For example, in a case where an image is formed of halftone dots as in printed documents, pixels in a gray portion are configured to appear gray in a macro view by mixing three colors of C, M, and Y. Due to this configuration, in a case where the color/monochrome determination is performed on a gray image as described above at a micro level, many pixels are determined to be color pixels.

In order to solve this problem, conceivable is a method of determining whether a target pixel is a color pixel or a monochrome pixel by using not only the saturation of the target pixel but also the saturations of pixels in the vicinity of the target pixels. For example, a following method is conceivable. The average of the saturation of the target pixel and saturations of the pixels in the vicinity of the target pixels is obtained. In a case where the average is greater than a threshold value, the target pixel is determined to be a color pixel. Meanwhile, in a case where the average is smaller than the threshold value, the target pixel is determined to be a monochrome pixel (see Japanese Patent Laid-Open No. 2004-320447).

However, in a case where the aforementioned method is used, the saturation becomes too low due to the averaging and this causes another type of erroneous determination. For example, small color contents such as a string of letters of a small point size are formed of groups of narrow lines and dots. In a case where the averaging processing is performed with a pixel in such small color contents set as the target pixel, the saturation of the color contents of the target pixel decreases due to an effect of pixels in an achromatic color background portion adjacent to the small color contents. This method thus has a problem that an image which should be determined to be a color image is erroneously determined to be a monochrome image as a result of this decrease.

SUMMARY OF THE INVENTION

An image processing apparatus of the present invention comprises: a specifying unit configured to specify pixels other than a white pixel which are included in a window, the window including a target pixel and pixels in a vicinity of the target pixel in a scanned image; an averaging unit configured to average color values of the specified pixels other than the white pixel; and a determination unit configured to determine whether the target pixel is a color pixel based on a color value obtained by the averaging.

Further features of the present invention will become apparent from the following description of exemplary embodiments (with reference to the attached drawings).

BRIEF DESCRIPTION OF THE DRAWINGS

FIGS. 15A and 15B are views for explaining other examples of the window region limitation in the smoothing processing in the embodiment; and FIGS. 16A and 16B are views for explaining weighting for a window in the smoothing processing in the embodiment.

DESCRIPTION OF THE EMBODIMENTS

Embodiments of the present invention are described below by using the drawings. Note that the configurations shown in the following embodiments are merely examples and the present invention is not limited to the configurations shown in the drawings.

Embodiment 1

Configuration of Image Processing Apparatus

Figure 1:
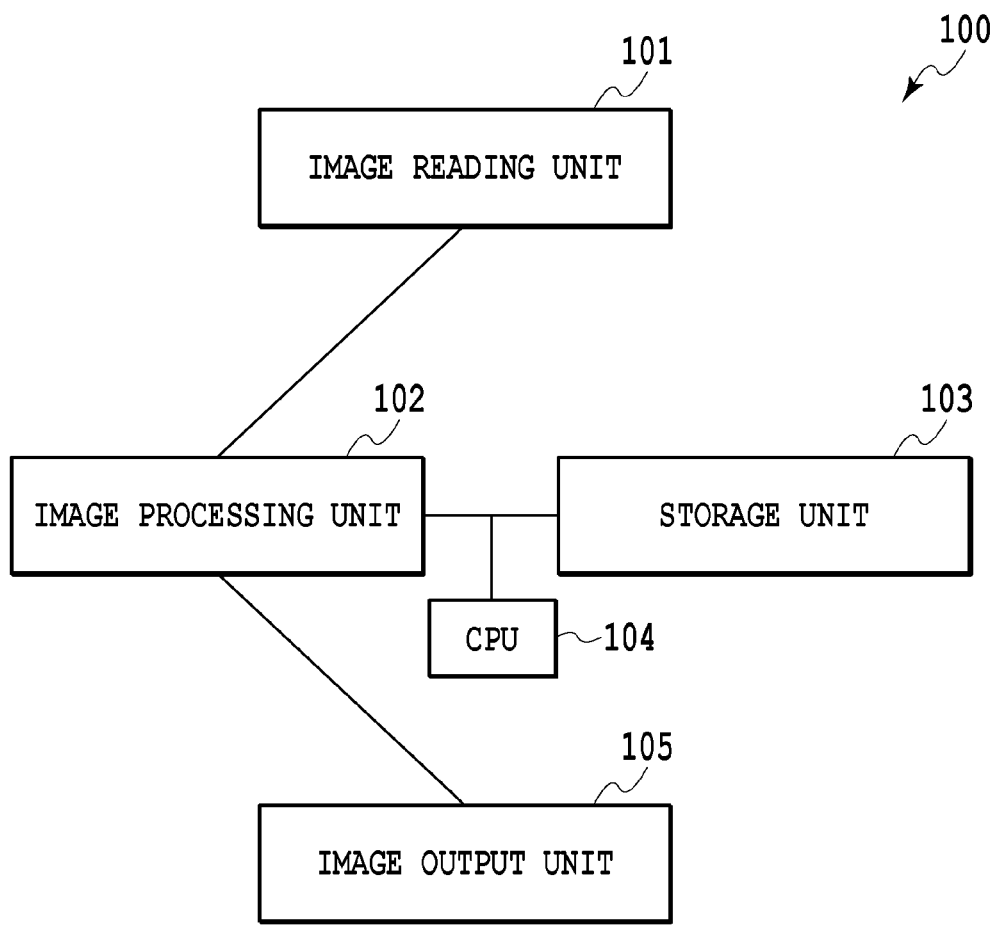
FIG. 1 is a view showing a configuration of an image processing apparatus in an embodiment.

FIG. 1 is a block diagram showing a configuration of an image processing apparatus 100. As shown in FIG. 1, the image processing apparatus 100 includes an image reading unit 101, an image processing unit 102, a storage unit 103, a CPU 104, and an image output unit 105. The image processing apparatus is connectable to a server configured to manage image data, a personal computer (PC) configured to instruct execution of printing, and the like via a network and the like.

The image reading unit 101 reads an image of a document and outputs image data. The image processing unit 102 performs image processing such as color space conversion processing and processing of determining whether image data received from the image reading unit 101 or the outside is a color or monochrome image data (hereafter, referred to as color/monochrome determination), and stores the image data in a buffer of the storage unit 103. Details of the color/monochrome determination processing are described later. The image processing unit 102 also generates bitmap data based on the stored image data, performs printer gamma correction processing and dithering processing on the generated data, and then outputs the data from the image output unit 105.

The storage unit 103 is formed of a ROM, a RAM, a hard disk (HD), and the like. The ROM stores various control programs and image processing programs which are executed by the CPU 104. The RAM is used as a reference space for data reference and a work space for data. Moreover, the RAM and HD are used in the aforementioned storing of the image data. In the RAM and the HD, the image data is stored, pages are sorted, a document including multiple sorted pages is stored, and print output of multiple copies is performed. The image output unit 105 outputs a color image by forming the color image on a recording medium such as recording paper.

[Overall View of Apparatus]

Figure 2:
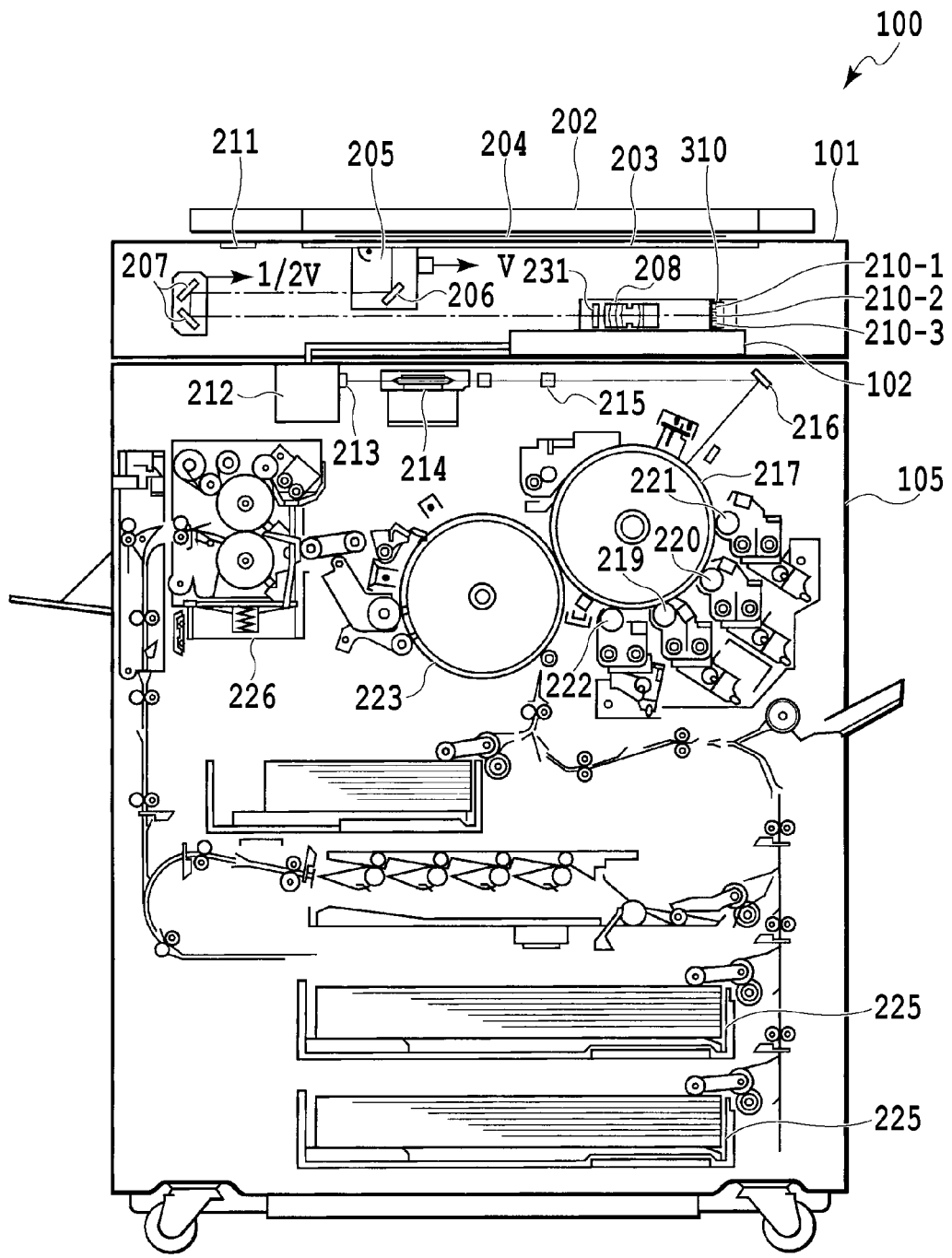
FIG. 2 is an overall view of the image processing apparatus in the embodiment.

FIG. 2 is an overall view of the image processing apparatus 100 in the embodiment. The configurations which are the same as those in FIG. 1 are denoted by the same reference numerals. In the image reading unit 101, a document 204 from which an image is to be read is placed between a document table glass 203 and a document pressing plate 202 and is illuminated with light of a lamp 205. Light reflected from the document 204 is guided by mirrors 206 and 207 and is focused into an image on a three-line sensor 210 by a lens 208. The lens 208 is provided with an infrared blocking filter 231. A not-illustrated motor moves a mirror unit including the mirror 206 and the lamp 205 in the direction of the arrow at a speed of V, and moves a mirror unit including the mirrors 207 in the direction of the arrow at a speed of V/2. In other words, the mirror units are moved in a direction (sub-scanning direction) perpendicular to an electric scanning direction (main scanning direction) of the three-line sensor 210 to scan an entire surface of the document 204.

The three-line sensor 210 formed of three lines of CCD sensors performs color separation on received optical information, reads color components of red R, green G, and blue B in full color information with corresponding line sensors, and sends signals of the color components to the image processing unit 102. The CCD sensors forming the three-line sensor 210 each have a light receiving element of 7000 pixels and can read an A3-size document, which is the maximum document size placeable on the document table glass 203, at a resolution of 600 dpi in a direction in which the shorter side of the document extends (297 mm).

A standard white plate 211 is provided to correct data read by each of CCD sensors 210-1 to 210-3 in the three-line sensor 210. The color of the standard white plate 211 is white which has substantially uniform reflection characteristics in a visible light.

Since the sensors for the respective colors in the three-line sensor 210 are physically spaced away from one another, there is a difference in time of reading a printed object at the same coordinates on the document 204 among the sensors. Generally, image signals can be read with this difference being corrected by adjusting the distances among the sensors. However, this correction is made under the assumption that the aforementioned movement of each of the mirror units in the sub-scanning direction is smooth uniform motion. If the speed of the motion is not uniform, reading positions of RGB shift, and a false color appears at an edge of a black printed object which actually has no color difference in RGB. The false color refers to a situation where a color which is actually not present appears in an image. The motion by the motor inevitably includes sections in which acceleration and deceleration is made and the speed is not uniform, particularly in start and end of the motion, and the false color tends to occur in such sections. Furthermore, it is difficult to completely eliminate the false color due to tolerances in attachment of the sensors, and there is a case where the false color occurs in a section other than the sections in the start and end of the motion by the motor. Specifically, color shift includes a first color shift caused by acceleration and deceleration in the movement of the mirror units and a second color shift caused by other reasons. This shift in reading positions for the respective colors in the reading by the three-line sensor is collectively referred to as color shift. Processing considering the color shift is performed in the color/monochrome determination processing to be described later.

That is the description of the processing of reading a document. Description is given below of processing of printing a read scanned image in the image processing unit 102. The image processing unit 102 electrically processes image signals received from the three-line sensor 210. For example, the image processing unit 102 performs color conversion processing on image data composed of RGB values to generate image signals indicating color components of cyan C, magenta M, yellow Y, and black K, and sends the generated CMYK image signals to the image output unit 105. An image outputted in this case is a CMYK image subjected to half-tone processing such dithering.

The image processing unit 102 automatically determines whether a received image is formed only of monochrome portions or includes color components. In a case where the image is formed only of monochrome portions, only K among the CMYK is used. This can achieve reduction of data, reduction of toner, and an increase in speed. Specific description is given below of a point that the reduction of data, the reduction of toner, and the increase in speed is made possible.

In the image output unit 105, the image signals of C (cyan), M (magenta), Y (yellow), or K (black) sent from the image processing unit 102 are sent to a laser driver 212. The laser driver 212 performs modulation driving of a semiconductor laser element 213 according the received image signals. A laser beam outputted from the semiconductor laser element 213 and traveling through a polygon mirror 214, an f-θ lens 215, and a mirror 216 scans a photosensitive drum 217 to form an electrostatic latent image on the photosensitive drum 217.

A developing device is formed of a magenta developing unit 219, a cyan developing device 220, a yellow developing device 221, and a black developing device 222. The four developing devices come into contact with the photosensitive drum 217 one after another to develop the electrostatic latent image formed on the photosensitive drum 217 with toners of corresponding colors, and thereby form toner images. The recording paper fed from a recording paper cassette 225 is wound around a transfer drum 223, and the toner images on the photosensitive drum 217 is transferred onto the recording paper.

In a case where the result of the aforementioned color/monochrome determination processing is monochrome, there is no need to bring the cyan, magenta, and yellow developing devices into contact with the photosensitive drum 217, and only the processing of the black developing device is performed. Accordingly, the processing time is greatly reduced. Moreover, in a case where the image processing unit 102 determines that the received image is formed only of monochrome portions, the image processing unit 102 only needs to generate image signals corresponding to K in the color conversion processing. Accordingly, the amount of data can be reduced. Moreover, since only the black developing device is used, the usage amounts of toners of C, M, and Y can be reduced.

The recording paper on which the toner images of four colors of C, M, Y, and K are sequentially transferred as described above passes through a fixation unit 226, and the toner images are thereby fixed. Then, the recording paper is delivered to the outside of the apparatus.

[Image Processing Unit]

Figure 3:
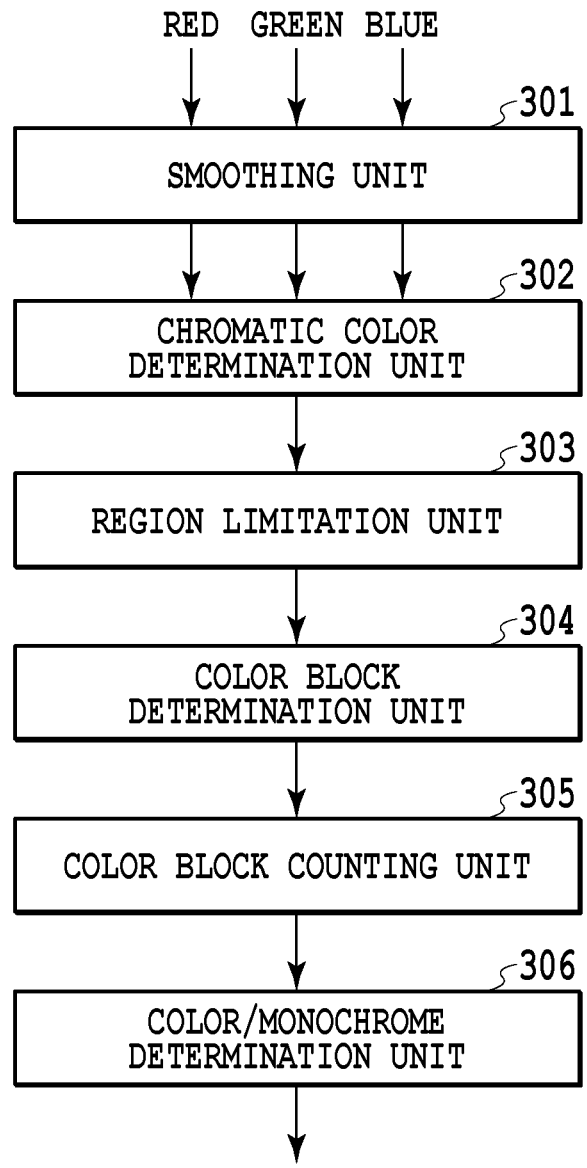
FIG. 3 is a processing block diagram of color/monochrome determination in the embodiment.

Overall description is given of the aforementioned color/monochrome determination processing in the image processing unit 102 by using FIG. 3. Note that details of processes in the color/monochrome determination processing are described later.

The processes described below are achieved as follows: the CPU 104 loads a program on the RAM from the ROM or the hard disk of the storage unit 103 and executes calculation processing based on program codes of the program. The CPU 104 performs image calculation processing while saving and loading the image data obtained by the image reading unit 101 and intermediate data generated in the processes, to and from the RAM as appropriate.

First, the image processing unit 102 receives the read image data expressed in RGB from the image reading unit 101. Description is given assuming that the directions of the image received herein are such that the main scanning direction is a direction in which rows of the line sensors extend in the image reading unit 101, and the sub-scanning direction is a sensor movement direction in the image reading unit 101. The line sensors are arranged in the sub-scanning direction. Accordingly, the false color which tends to occur due to color shift caused by the shift in the reading positions of the line sensors occurs in such a direction that the false color occurs in a narrow shape extending in the main scanning direction.

A smoothing unit 301 performs smoothing processing on the image data and suppresses effects of the color shift and a noise generated by the image reading unit 101. The noise in the embodiment is not a noise caused by the shift in the reading positions of the line sensors but a noise caused by the document itself. For example, in a case where the document is recycled paper, an image processing apparatus sometimes determines that the document has a chromatic color portion on a surface even though the document is not printed in color. Determination of whether a pixel of the read image data is a color pixel or a monochrome pixel based on the pixel is susceptible to the aforementioned color shift and the noise in the image. The smoothing unit 301 thus suppresses the effects of the color shift and noise. Note that the color shift suppressed by the smoothing unit 301 is the second color shift which occurs mainly due to the shift in the reading positions of the line sensors as described above.

A chromatic color determination unit 302 determines whether a target pixel in the image subjected to smoothing is a color pixel or a monochrome pixel, from the saturation S of the target pixel. Instead of simply determining whether the target pixel is a color pixel or a monochrome pixel, the chromatic color determination unit 302 may determine which one of a high-saturation pixel, a low-saturation pixel, and an achromatic color pixel the target pixel is. In the embodiment, description is given of an example in which the chromatic color determination unit 302 determines which one of the low-saturation pixel, the high-saturation pixel, and the achromatic color pixel the target pixel is, and outputs the result of this saturation determination.

A region limitation unit 303 limits a region in which the color/monochrome determination is performed in the scanned image to suppress effects of the first color shift caused by the acceleration and deceleration of the mirror units in the movement thereof. In a leading edge region and a trailing edge region, in the sub-scanning direction, of the document 204 read by the image reading unit 101, the first color shift caused by the acceleration and deceleration of the mirror units occurs in some cases. In such regions, a portion which should be determined to be a monochrome portion may be erroneously determined to be a color portion, due to the color shift. The region limitation unit 303 thus excludes such regions in advance from regions to be subjected to the color/monochrome determination.

A color block determination unit 304 determines whether each of blocks is a color block based on the number of chromatic color pixels in a block region. Details will be described later.

A color block counting unit 305 detects color block groups while performing pattern matching and counts the number of color block groups. Details will be described later.

A color/monochrome determination unit 306 determines whether the document 204 is a color document or a monochrome document based on the number of color block groups. Details will be described later.

[Smoothing Unit]

As described above, the smoothing unit 301 performs processing of suppressing the effects of noise and color shift. In the smoothing, the smoothing unit 301 can suppress the effects of noise and color shift by performing smoothing in a sufficiently large area. For example, since the aforementioned second color shift occurs due to the shift in the reading positions of the sensors arranged in the sub-scanning direction, suppressing effects can be improved by obtaining averages in a region longer in the sub-scanning direction. However, in a method where the smoothing is performed simply in a large area, there is a case where a pixel which is actually a color pixel is smoothed by surrounding pixels and the image processing apparatus determines that the pixel is not a color pixel but a monochrome pixel. In other words, erroneous determination may be made in the color/monochrome determination. In view of this, the smoothing unit 301 of the embodiment performs processing of suppressing the effects of noise and color shift while suppressing the erroneous determination.

Figure 4:
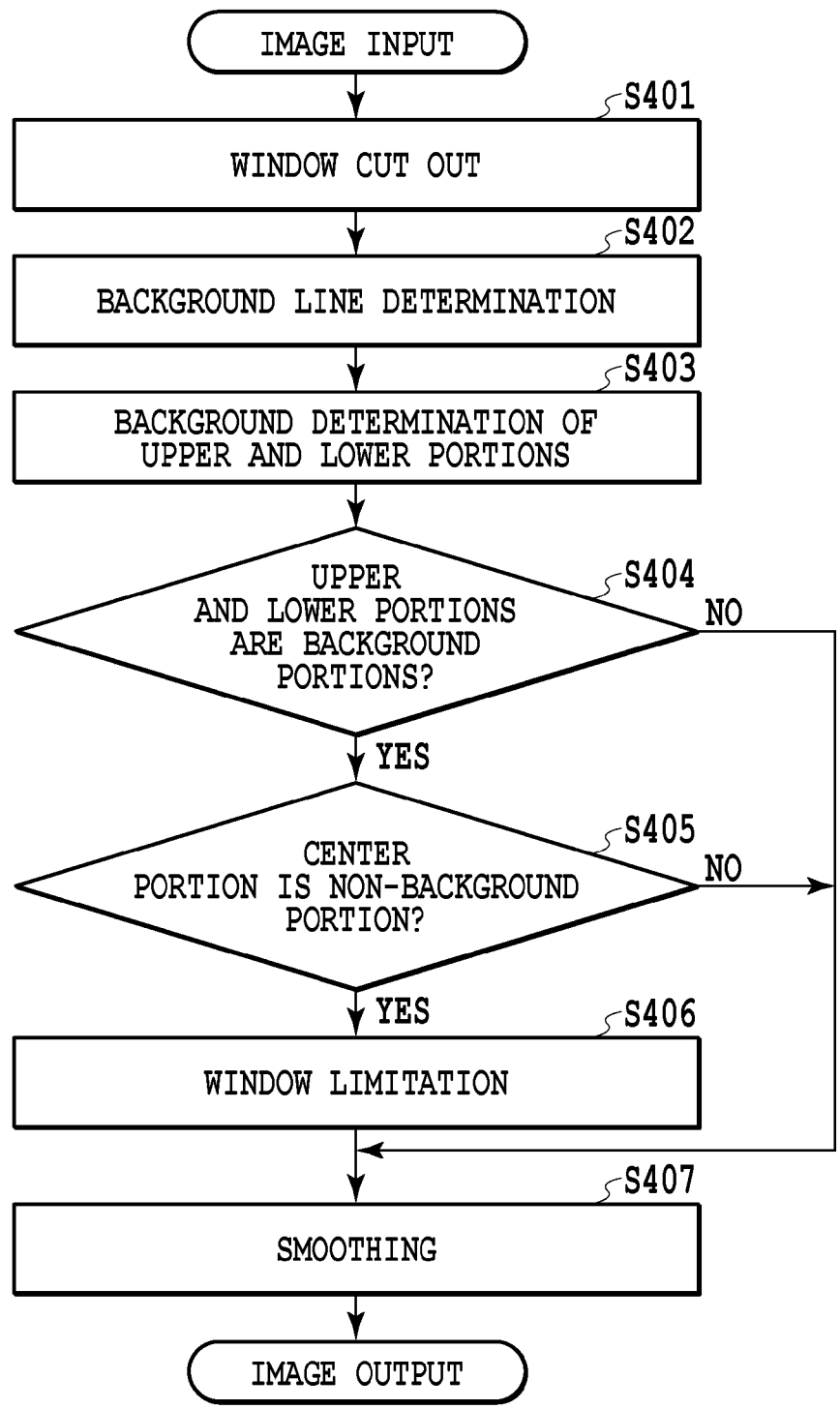
FIG. 4 is a flowchart showing a processing flow of a smoothing unit in the embodiment.
Figure 5:
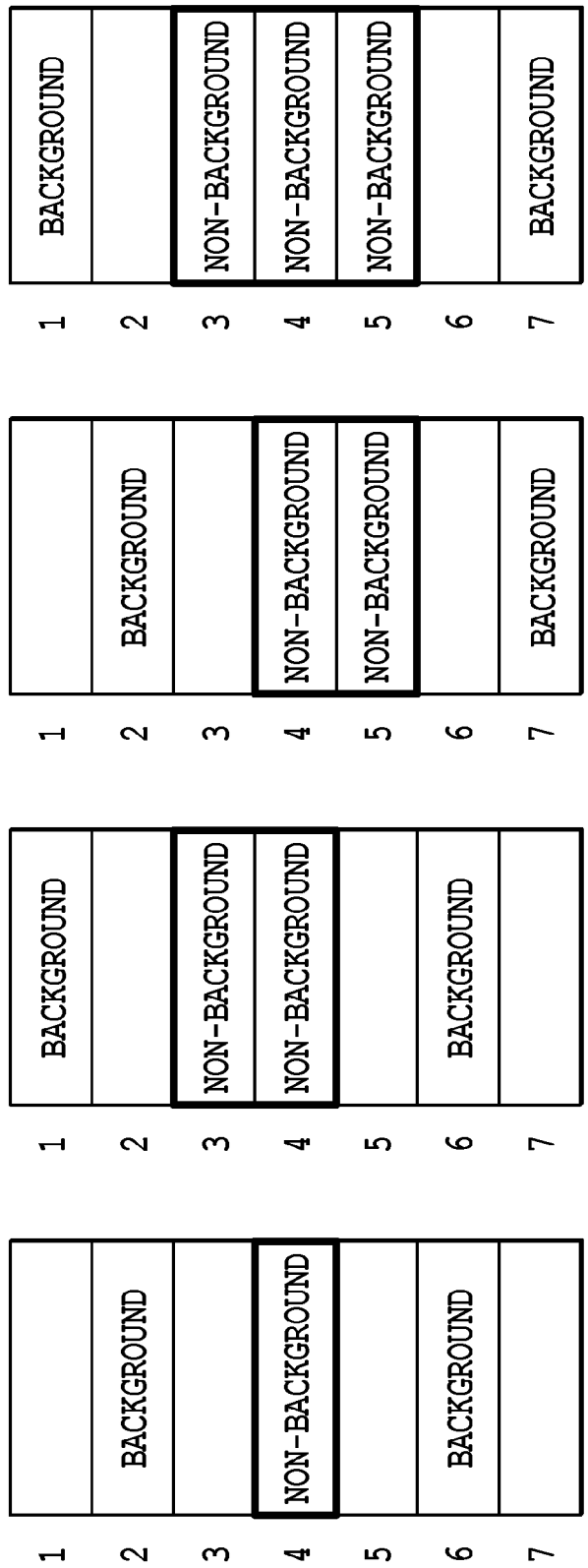
FIGS. 5A to 5D are views for explaining window region limitation in smoothing processing in the embodiment.

A processing flow of the smoothing unit 301 is described by using FIG. 4. In step S401, upon receiving image data composed of RGB, the smoothing unit 301 cuts out a window including multiple pixels from the image. Specifically, description is given assuming that the window has a size of three pixels horizontal by seven pixels vertical, the position of a target pixel of the window is at the center pixel of the window, and a line including the target pixel is a target line. In other words, the window includes the target pixel and pixels in the vicinity of the target pixels. FIGS. 5A to 5D are views showing examples of the windows. In FIGS. 5A to 5D, one line is formed of three pixels arranged in the horizontal direction. Description using FIGS. 5A to 5D will be given later. The window has a shape elongated in the vertical direction for the following reason. Since the color shift is a shift in the sub-scanning direction, the effects of suppressing the color shift can be improved by setting the window to have a longer length in the sub-scanning direction.

Next, in step S402, the smoothing unit 301 determines whether each of the seven lines in the window is a background portion. Specifically, in a case where all three pixels forming a line are background pixels, the smoothing unit 301 determines that the line is a background line. In a case where at least one of the pixels is not a background pixel, the smoothing unit 301 determines that the line is a non-background line. The smoothing unit 301 determines whether each pixel is a background pixel by determining whether each of input pixel values is within a range of values which has a certain width based on RGB values expressing a sheet background of the inputted document. For example, the smoothing unit 301 determines that a pixel is a background pixel in a case where input pixel values R, G, and B satisfy the following conditions:

if $((R1-W/2<R<R1+W/2)$ AND $(G1-W/2<G<G1+W/2)$ AND $(B1-W/2<B<B1+W/2))$, where R1, G1, and B1 are RGB values of the background and W is a background allowable width. The values of R1, G1, and B1 may be predetermined values or results obtained by performing publicly-known background determination processing in which determination is made automatically depending on the sheet.

In step S403, the smoothing unit 301 determines whether a background portion exists in each of upper and lower regions of the window, based on a result of the determination of whether each of the lines is a background line. Specifically, the lines of the window are referred to as line 1 to line 7 from above, the lines 1 and 2 among these lines are defined as an upper portion, and the lines 6 and 7 among these lines are defined as a lower portion.

In step S404, the smoothing unit 301 determines whether there are background portions in both of the upper portion and the lower portion of the window. Specifically, the smoothing unit 301 determines that there are background portions in both of the upper and lower portions in a case where at least one of the lines 1 and 2 is a background line and at least one of the lines 6 and 7 is a background line, and the processing proceeds to step S405.

In step S405, the smoothing unit 301 further determines whether, in the window determined to include background portions in both of the upper and lower portions, a portion except background lines and lines adjacent thereto is a non-background portion. This is described with reference to FIGS. 5A to 5D. Processing proceeding to step S405 means that at least one of the lines 1 and 2 is a background line and at least one of the lines 6 and 7 is a background line. Accordingly, in the examples of FIGS. 5A to 5D, a center portion of the window including the target line is the portion except background lines and lines adjacent thereto, and is the target of the determination. For example, in a case where the background lines exist as in FIG. 5A, the line 4 which is the target line is the target of the determination of non-background portion. In a case where the lines 1 and 6 are the background lines as in FIG. 5B, the line 3 and the line 4 which is the target line are the target of the determination of non-background portion. By performing such determination processing, it is possible to check whether small color contents whose heights are smaller than four pixels exist in the window to extend in the horizontal direction. In a case where the portion except background lines and lines adjacent thereto is a non-background portion, the processing proceeds to step S406 and the smoothing unit 301 performs window limitation. In the smoothing processing of step S407 to be described later, the smoothing unit 301 performs the smoothing processing based on the window. In this case, the smoothing unit 301 performs the smoothing processing based on the window limited in step S406.

In step S406, the smoothing unit 301 limits the region of the window to a region determined to be a non-background portion in step S405. Specifically, the smoothing unit 301 limits the region of the window determined to include small color contents to a region from which background portions are excluded and in which the color contents exist. FIGS. 5A to 5D illustrate four types of situations. For example, in a case where the smoothing unit 301 determines that the lines 2 and 6 are background lines and the target line 4 is a non-background line as in FIG. 5A, the smoothing unit 301 limits the region of the window to a region of three pixels horizontal by one pixel vertical which includes only the target line. Similarly, in a case where the lines 1 and 6 are background lines and the lines 3 and 4 are non-background lines as in FIG. 5B, the smoothing unit 301 limits the region of the window to a region of three pixels horizontal by two pixels vertical which includes the lines 3 and 4. Moreover, in a case where the lines 2 and 7 are background lines and the lines 4 and 5 are non-background lines as in FIG. 5C, the smoothing unit 301 limits the region of the window to a region of three pixels horizontal by two pixels vertical which includes the lines 4 and 5. Furthermore, in a case where the lines 1 and 7 are background lines and the lines 3, 4, and 5 are non-background lines as in FIG. 5D, the smoothing unit 301 limits the region of the window to a region of three pixels horizontal by three pixels vertical which includes the lines 3, 4, and 5. Then, for example, the smoothing unit 301 performs evaluation in the order of FIGS. 5A to 5D and preferentially sets a region for which matching is achieved first as a target of processing.

In the determination, lines adjacent to background lines are also excluded because effects of the contents of the background lines on these regions are not small and including these lines in the window may decrease the saturation of the small color contents.

Lastly, in step S407, the smoothing unit 301 performs the smoothing processing on pixels in the window. In a case where the smoothing unit 301 has limited the window in step S406, the smoothing unit 301 performs the smoothing processing on pixels in the limited window. In a case where step S406 is skipped, the smoothing unit 301 performs the smoothing processing on pixels in the window of the predetermined size (three pixels horizontal by seven pixels vertical in this case). The smoothing unit 301 executes the smoothing processing by obtaining, for example, the average of pixel values in the window. Then, the smoothing unit 301 replaces the pixel value of the target pixel with the obtained average. The smoothing of the scanned image is performed by performing such processing with each of the pixels in the scanned image being set as the target pixel. The number of pixels used in each operation of obtaining the average varies depending on the limiting of the window.

Excluding background portions from the target of smoothing in the window in which small color contents may exist as described above can prevent the small color contents from being blurred and prevent decrease in the saturation of the small color contents in a case where the small color contents has a chromatic color. Meanwhile, in a case where there are no small color contents, it is possible to sufficiently exert the effects of smoothing and remove the noise and color shift included in the image.

Note that the background line determination in the aforementioned step S402 is performed to prevent decrease in the saturation of small color contents having a significant chromatic color and to avoid erroneous determination that pixels are achromatic color pixels. Accordingly, there is no need for the RGB values R1, G1, B1 of the background to be values expressing a chromatic color, and the background is an achromatic color background. In other words, the values of R1, G1, and B1 are values close to one another.

Moreover, in the aforementioned description, there is described a configuration in which the smoothing unit 301 determines whether each line in the window is a background line and excludes background lines and lines adjacent thereto from the target of smoothing. However, the smoothing unit 301 may perform determination of whether a certain portion is a background portion in units of pixels instead of lines. Specifically, in the processing from steps S402 to S405, the determination can be performed in units of pixels instead of lines. FIGS. 15A to 15B are views for explaining an example in which determination of whether a certain portion is a background portion is performed in units of pixels. For example, in a case where background pixels are included in the upper and lower portions of the window as shown in FIG. 15A, the smoothing can be performed on non-background pixels in the center portion which are not adjacent to these background pixels in a vertical direction. In the example of FIG. 15A, the smoothing is performed on five non-background pixels in the center portion which are illustrated by bold lines. Moreover, the smoothing can be performed also in a case where a background pixel is absent at any of the positions above or below the non-background pixels. For example, in a case shown in FIG. 15B, the smoothing can be performed on eight non-background pixels in the center portion which are not adjacent to background pixels. Determining whether a certain portion is a background portion in units of pixels can achieve an effect of suppressing decrease in the saturation of chromatic color contents of any shape. In the embodiment, in a case of limiting the window, processing of limiting the window to a region of 3×3 including the target pixel is performed. Specifically, the window is basically limited to pixels in the third to fifth line. Meanwhile, FIG. 15B shows an example in which pixels in the second to fourth line are used for pixels on the left side. This is because higher saturation decrease suppressing effect is likely to be obtained by using pixels which are clearly non-background pixels, i.e. pixels which are not pixels adjacent to background portions. Note that there is no need to limit the window to a region of 3×3. For example, the smoothing may be performed with a center pixel (although not illustrated, the center pixel is assumed to be a non-background pixel) of the sixth line of FIG. 15B being included in the targets of smoothing.

Furthermore, although description is given of an example in which the smoothing processing is performed by obtaining the average of the pixel values in the window, it is possible to perform filter processing by using a smoothing filter in which, for example, the line center is weighted. In this case, there may be used a filter in which no weight is given to the aforementioned background portions and portions adjacent thereto are slightly weighted.

Moreover, in the aforementioned description, there is described a configuration in which lines adjacent to background lines in the upper and lower portions are excluded from the target of smoothing. However, lines adjacent to background lines and pixels adjacent to background pixels can be reflected as the target of smoothing by being given small weights, without being completely excluded. For example, FIG. 16A shows weights corresponding to FIG. 15A described above. In FIG. 16A, the weights of the non-background pixels in the center portion illustrated by the bold lines in FIG. 15A are set to 2 and the weights of the background pixels are set to 0. Moreover, the weights of the pixels between a group of the non-background pixels in the center portion illustrated by the bold lines and a group of the background pixels in each of the upper and lower portions is set to half the weight of the non-background pixels in the center portion. Although there is a possibility that the pixels between the group of the non-background pixels in the center portion and the group of the background pixels in each of the upper and lower portions are affected by the color shift, weakly reflecting the values of these pixels can provide an effect of suppressing decrease in the saturation. Similarly, FIG. 16B shows weights corresponding to FIG. 15B. Note that, although FIG. 16B shows weights set under a condition where the window is limited to the aforementioned region of 3×3, there is no need to perform weighting under such condition as described above. For example, the weight of 2 may be given to a center pixel (in this case, the center pixel is a non-background pixel) of the sixth line and a center pixel (in this case, the center pixel is a non-background pixel) of the seventh line. Alternatively, the weight of 1 instead of 2 may be given to the center pixel (in this case, the center pixel is a non-background pixel) of the seventh line which is a boundary portion of the window. This can achieve a balance between the decrease in the saturation and the accuracy of determining background portions and non-background portions. Moreover, in the aforementioned description, there is described an example in which the window is limited in a case where there are background portions in lines in both of the upper and lower portions. However, the window may be limited in a case where there is a background portion in a line in one of the upper and lower portions. Furthermore, although the description is given by using the window of three pixels horizontal by seven pixels vertical, the window is not limited to this example. The number of lines and the like used in the aforementioned determination of background line in the upper and lower portions can be changed depending on a change in the number of pixels used in the window. Moreover, although description is given of an example in which a rectangular window is set, the shape of the window is not limited to a rectangle.

[Chromatic Color Determination Unit]

Next, processing of the chromatic color determination unit 302 is described. The chromatic color determination unit 302 determines which one of the high-saturation pixel, the low-saturation pixel, and the achromatic color pixel a target pixel in the image subjected to the smoothing by the smoothing unit 301 is from the saturation S of the target pixel, and outputs the result of the saturation determination. The saturation S can be calculated by using, for example, the following formula.

$$S=MAX(R,G,B)-MIN(R,G,B) \quad \text{formula (1)}$$

In this formula, MAX(R, G, B) express the maximum values of the respective colors of R, G, and B, and MIN(R, G, B) express the minimum values of the respective colors of R, G, and B. The chromatic color determination unit 302 performs the following threshold processing for the thus-calculated saturation S to determine which one of the high-saturation pixel, the low-saturation pixel, and the achromatic color pixel the target pixel is:

if (S<Th1) Then achromatic color pixel
else if (S<Th2) Then low-saturation pixel
else high-saturation pixel
where Th1<Th2.

[Region Limitation Unit]

Figure 6:
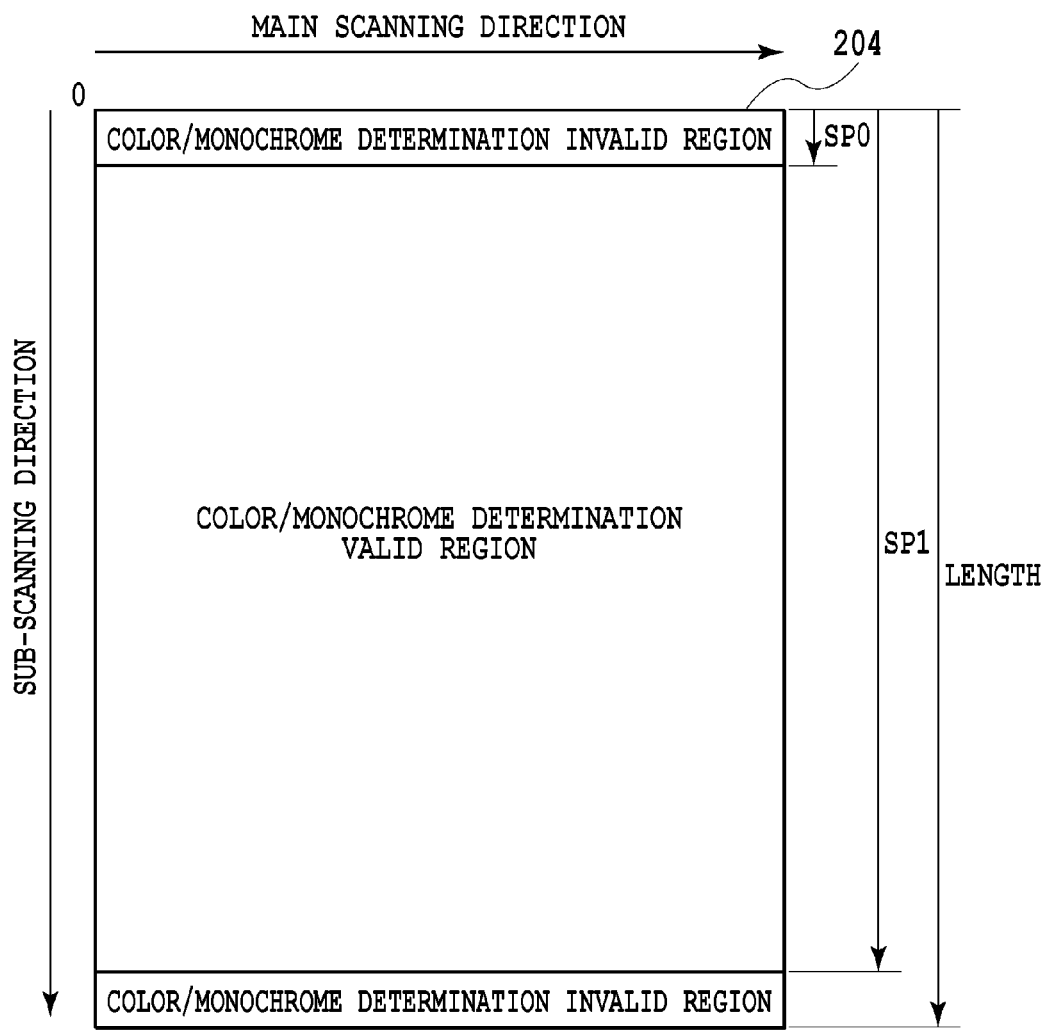
FIG. 6 is a view showing an example of a region limited by a region limitation unit in the embodiment.

Next, processing of the region limitation unit 303 is described. FIG. 6 is a view showing an example of a region limited by the region limitation unit 303. The region limitation unit 303 sets sp0, sp1, and length from the original point side in the sub-scanning direction, where length is the length of the document. Such coordinate specification can divide a region of the document into a color/monochrome determination valid region and color/monochrome determination invalid regions as shown in the drawings. Specifically, the region limitation unit 303 forcibly replaces the determination results of the chromatic color determination unit 302 with determination results that pixels are achromatic color pixels, for all of the pixels in the color/monochrome determination invalid regions. The color/monochrome determination processing can be thus performed only for the pixels in the color/monochrome determination valid region.

Note that the color/monochrome determination invalid regions are not limited to a leading edge region and a trailing edge region of the document in the sub-scanning direction, and may be set to left and right end regions or multiple portions in the document.

[Color Block Determination Unit]

Figure 7:
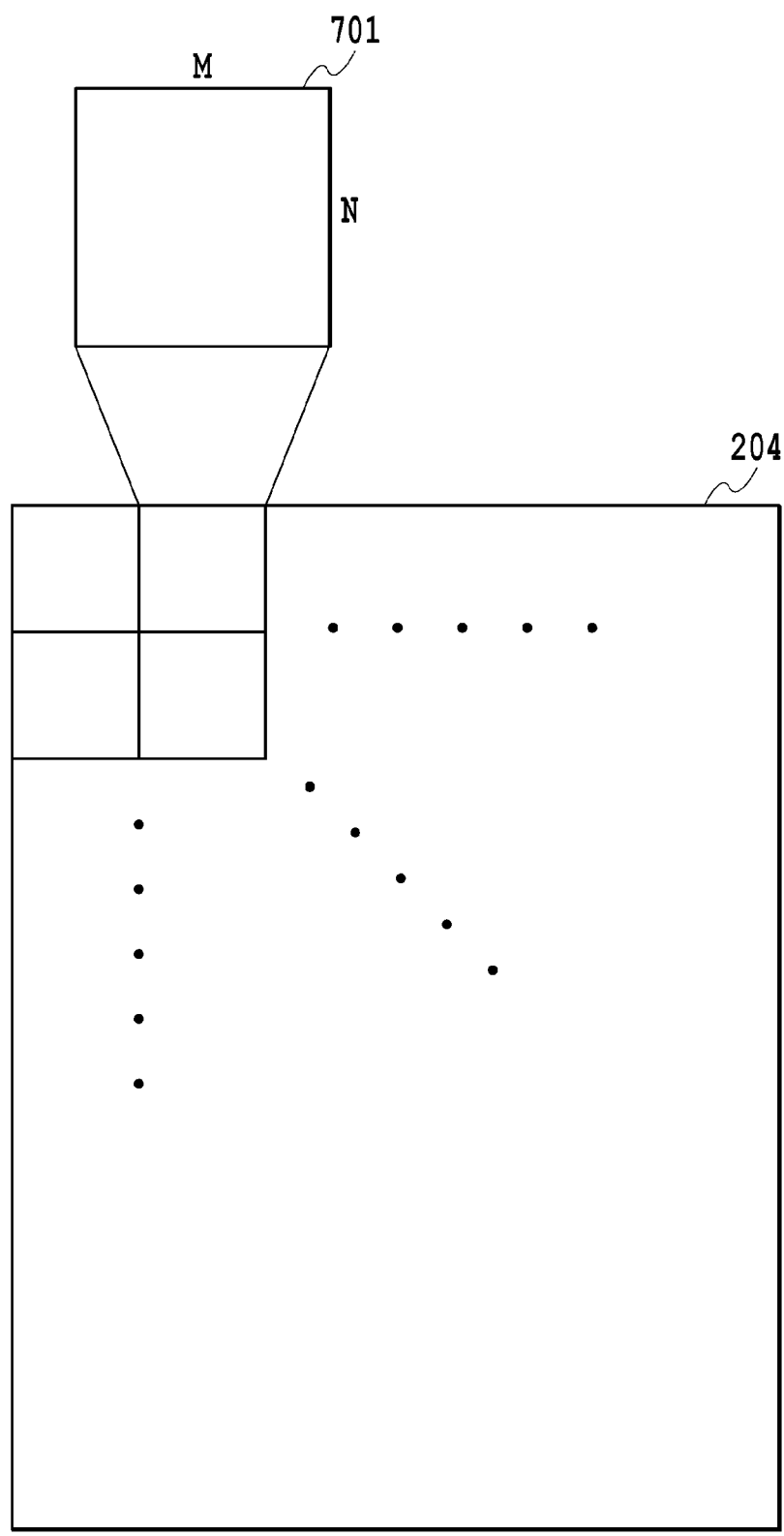
FIG. 7 is a view for explaining block regions in the embodiment.

Next, processing of the color block determination unit 304 is described. The color block determination unit 304 divides the scanned image obtained from the document 204 into block regions 701 each formed of M×N (M and N are integers) pixels as shown in FIG. 7. Then, the color block determination unit 304 determines whether each of the blocks is a color block based on the results of the chromatic color determination unit 302. For example, in a case where image scanning is performed in 600 dpi and the size of each block is set to 16 pixels by 16 pixels, the size of each block is close to the size of a letter of 3 pt (American point: 1 pt≈0.35 mm).

Figure 8:
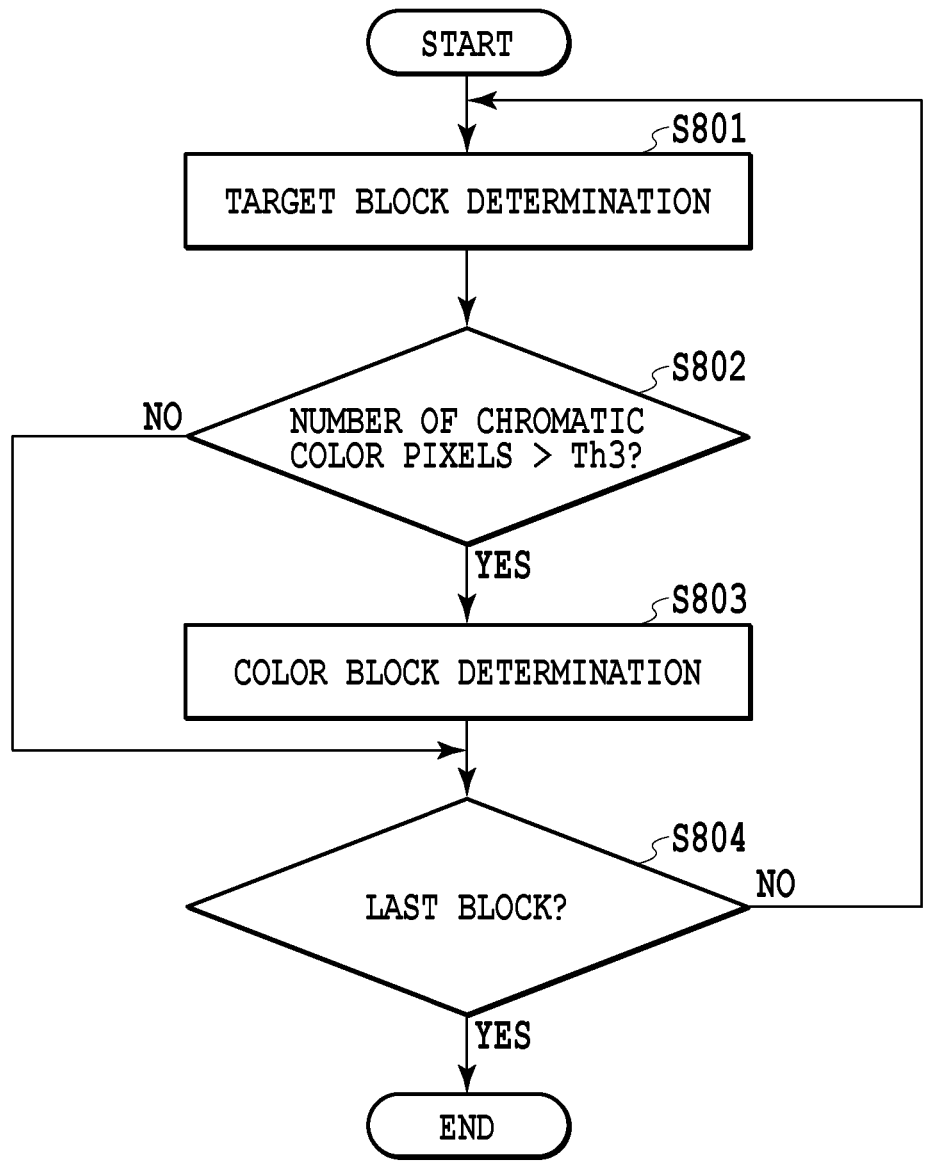
FIG. 8 is a flowchart showing a processing flow of a color block determination unit in the embodiment.

FIG. 8 is a flowchart for explaining an operation of the color block determination unit 304. In step S801, the color block determination unit 304 determines a target block which is a target of the processing. In the embodiment, the first target block is a block on the original point side in the main scanning direction and the sub-scanning direction, and the target block moves to the next block in the main scanning direction every time the processing is repeated, and the same operation is repeated in the sub-scanning direction. The last target block is a block at a lower right corner of the document.

In step S802, the color block determination unit 304 compares the number of chromatic color pixels in the target block determined in step S801 and a preset threshold value Th3 with each other. In this case, the number of chromatic color pixels may be the total of the number of low-saturation pixels and the number of high-saturation pixels or, for example, the total of these numbers obtained with the number of high-saturation pixels being multiplied by a weighting factor.

In step S803, the color block determination unit 304 determines that the target block determined in step S801 is a color block in a case where the number of the chromatic color pixels is greater than Th3 in step S802. In step S804, the color block determination unit 304 returns to step S801 in a case where the target block is not the last block, and repeats the color block determination. The color block determination unit 304 can determine whether a block is a color block for all of the blocks in the scanned image by performing the operation described above.

Figure 9:
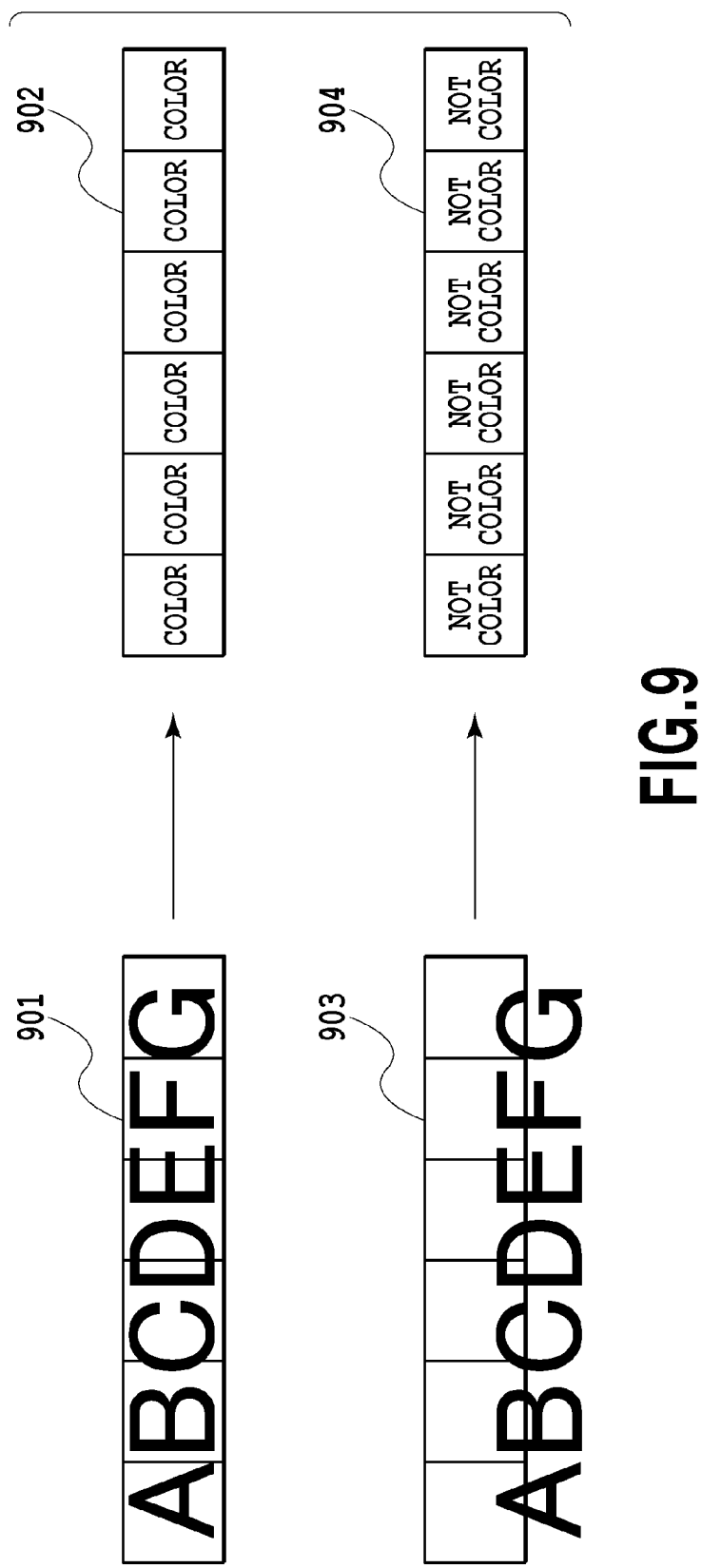
FIG. 9 is a view for explaining phases of color contents and block regions in the embodiment.

The phases of the color contents and the block regions in the document 204 are described. For example, in a case where the sizes of the color contents are close the size of the block regions as shown in FIG. 9, the result of the color block determination greatly varies depending on the phases of the color contents and the block regions. In a case where the phase relationship is like one denoted by reference numeral 901, no problem occurs since the color block determination unit 304 can determine that all of the blocks are color blocks as shown in the determination result for the blocks denoted by reference numeral 902. However, in a case where the phase relationship is like one denoted by reference numeral 903, the amount of chromatic color pixels in each of the blocks is reduced to about half of that of reference numeral 901. Hence, the color block determination unit 304 may determine that the number of chromatic color pixels does not reach the threshold value Th3 and the blocks are not color blocks, as in the result denoted by reference numeral 904. Description is given of a method for reducing effects of such phase relationships between the color contents and the block regions on the result of the color block determination.

Figure 10:
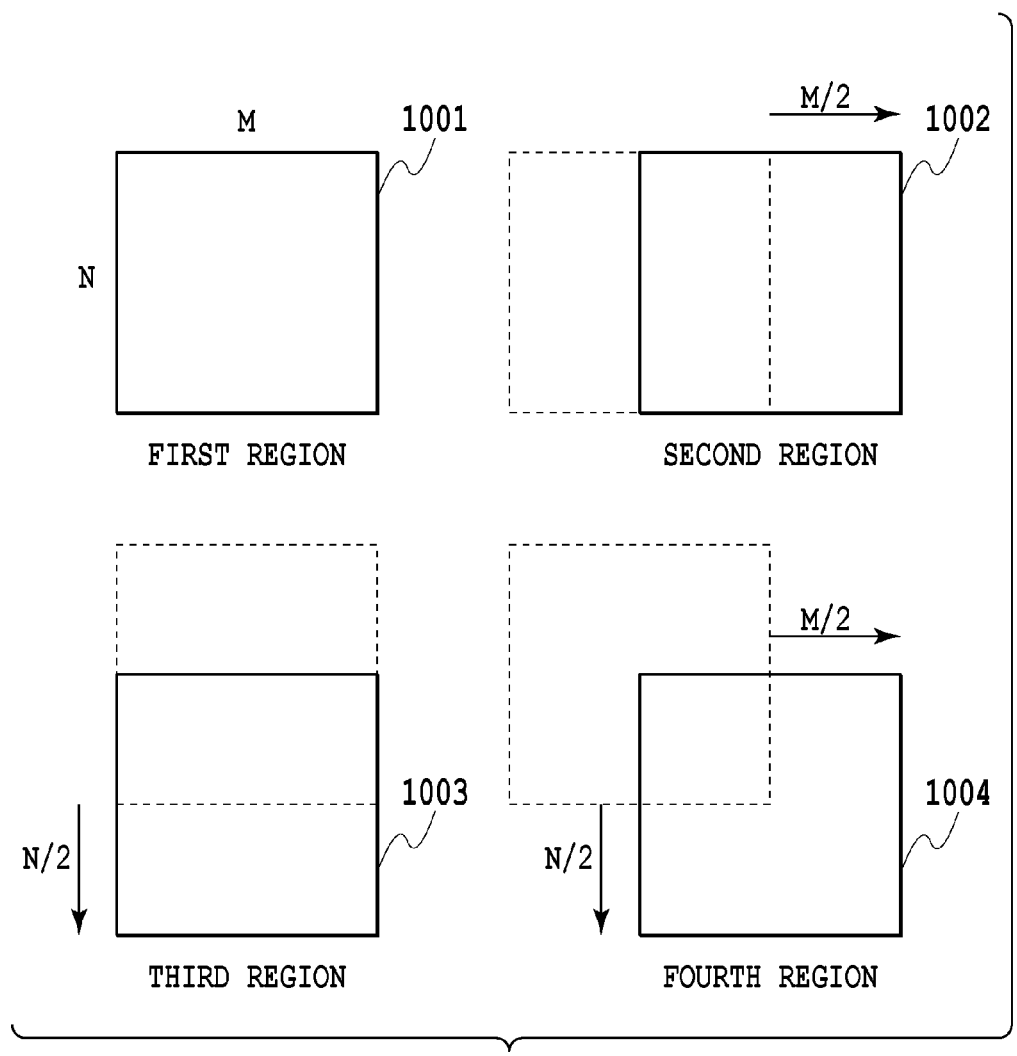
FIG. 10 is a view showing examples of regions in which the number of chromatic color pixels is counted in the embodiment.

FIG. 10 shows regions in which the number of chromatic color pixels is counted for a target block region of M×N pixels. The count number of chromatic color pixels in a first region 1001, i.e. the target block region is referred to as Cnt1. A second region 1002 is a region of M×N pixels moved by M/2 pixels in the main scanning direction from the first region 1001. The count number of chromatic color pixels in the second region 1002 is referred to as Cnt2. A third region 1003 is a region of M×N pixels moved by N/2 pixels in the sub-scanning direction from the first region 1001. The count number of chromatic color pixels in the third region 1003 is referred to as Cnt3. A fourth region 1004 is a region of M×N pixels moved by M/2 pixels in the main scanning direction and by N/2 pixels in the sub-scanning direction from the first region 1001. The count number of chromatic color pixels in the fourth region 1004 is referred to as Cnt4. The final chromatic color count number Cnt in the target block region is the largest value among Cnt1, Cnt2, Cnt3, and Cnt4 as shown in formula (2).

$$Cnt=Max(Cnt1,Cnt2,Cnt3,Cnt4) \qquad \text{formula (2)}$$

This reduces the effects of the phase relationships between the color contents and the block regions on the result of the color block determination even in a situation like one denoted by reference numeral 903 of FIG. 9, and a result close to that denoted by reference numeral 902 in FIG. 9 can be obtained.

[Color Block Counting Unit]

Next, processing of the color block counting unit 305 is described. The color block counting unit 305 detects color block groups based on consecutiveness of the block regions subjected to the color block determination in the color block determination unit 304 and counts the number of color block groups. Each of the color block groups is a group of several blocks recognized as one aggregate. In the embodiment, in a case where a color block group matches a predetermined arrangement pattern, processing of incrementing the number of color block groups is performed.

Figure 11:
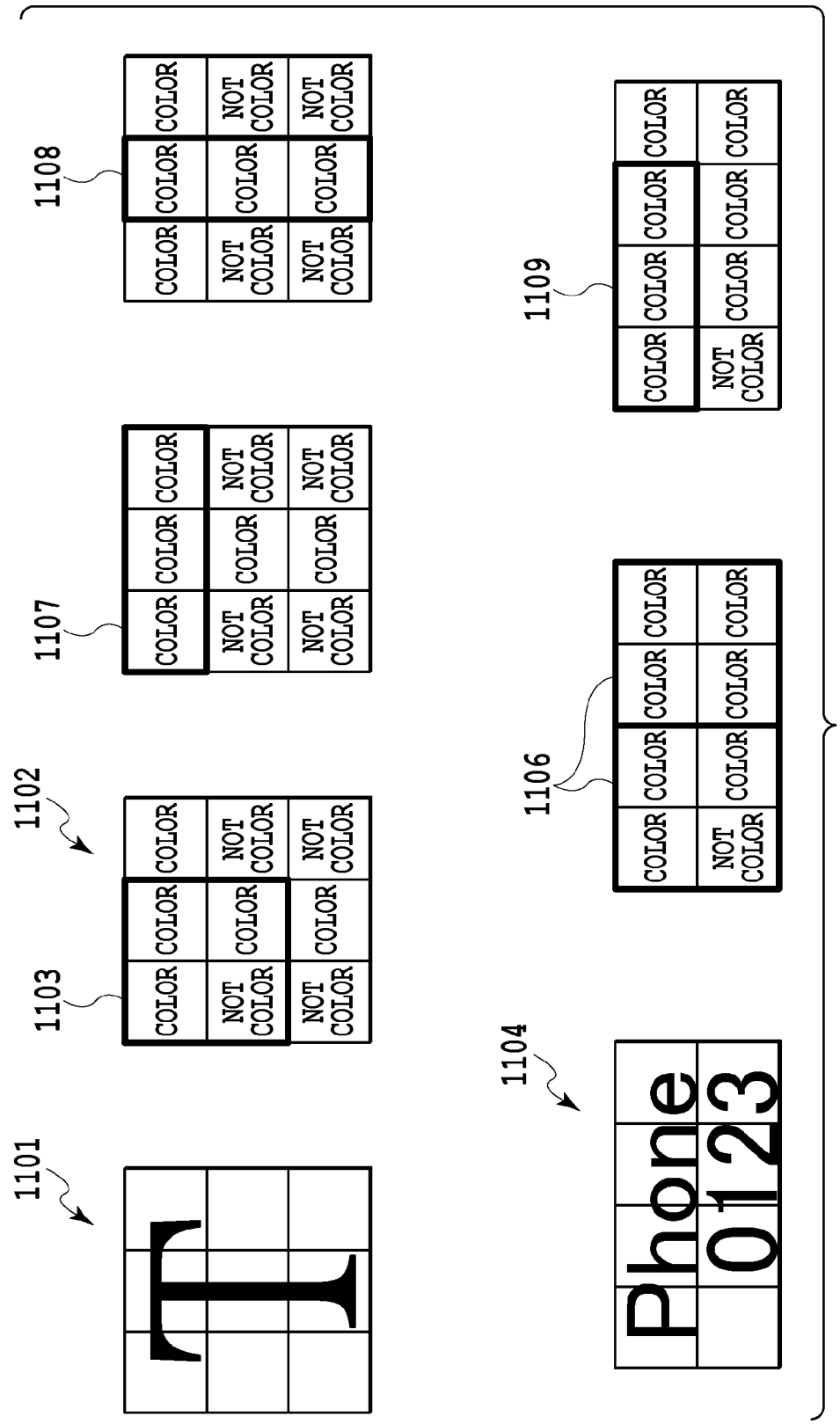
FIG. 11 is a view for explaining a color block group in the embodiment.

First, the color block group is described by using FIG. 11. Contents 1101 give an example of a case where color contents large relative to block regions exist. The contents 1101 show an example where a letter T which is the large color contents is sectioned into units of blocks. The letter T which is the large color contents is contents with a size corresponding to three blocks horizontal by three blocks vertical. A color block determination result 1102 shows a result of the color block determination for each of the blocks of the contents 1101. As is apparent from the color block determination result 1102, there are block regions which are not determined to be color blocks, depending on the shape of the color contents.

Meanwhile, contents 1104 give an example of a case where small color contents as large as block regions are arranged. The contents 1104 are contents in which numbers are arranged with an indentation after letters of "Phone". A color block determination result 1105 shows a result of the color block determination for each of the blocks of the contents 1104. As is apparent from the color block determination result 1105, there is a block region which is not determined to be a color block, depending on the arrangement of color contents.

In other words, there are block regions which are not determined to be color blocks in individual block regions, depending on the shapes and arrangement of color contents. In the embodiment, processing considering existence of block regions which are not determined to be color blocks as described above is performed in the counting of the number of color block groups. For example, assume a case where the color block determination unit 304 determines that a certain region is a color block group in a case where three or more color blocks exist in a window of 2×2 blocks as shown in a region 1103 and regions 1106. In such a case, the contents described above can be detected as color block groups. However, a case where three or more color blocks do not exist in a window of 2×2 blocks is conceivable depending on the shapes and arrangement of the color contents. In the embodiment, the color block determination unit 304 thus detects color block groups in consideration of various shapes and arrangement of color contents. For example, the color block determination unit 304 can detect a region 1107 and a region 1108 as color block groups for the large color contents 1101. Moreover, the color block determination unit 304 can detect a region 1109 as a color block group for the small color contents 1104. In these cases, three color blocks exist in windows of 3×1 blocks and a window of 1×3 blocks. As described above, since various color block groups are conceivable depending on the sizes of color contents and the size of block regions in the document 204, an example of a method of detecting such various color block groups is described below.

Figure 12:
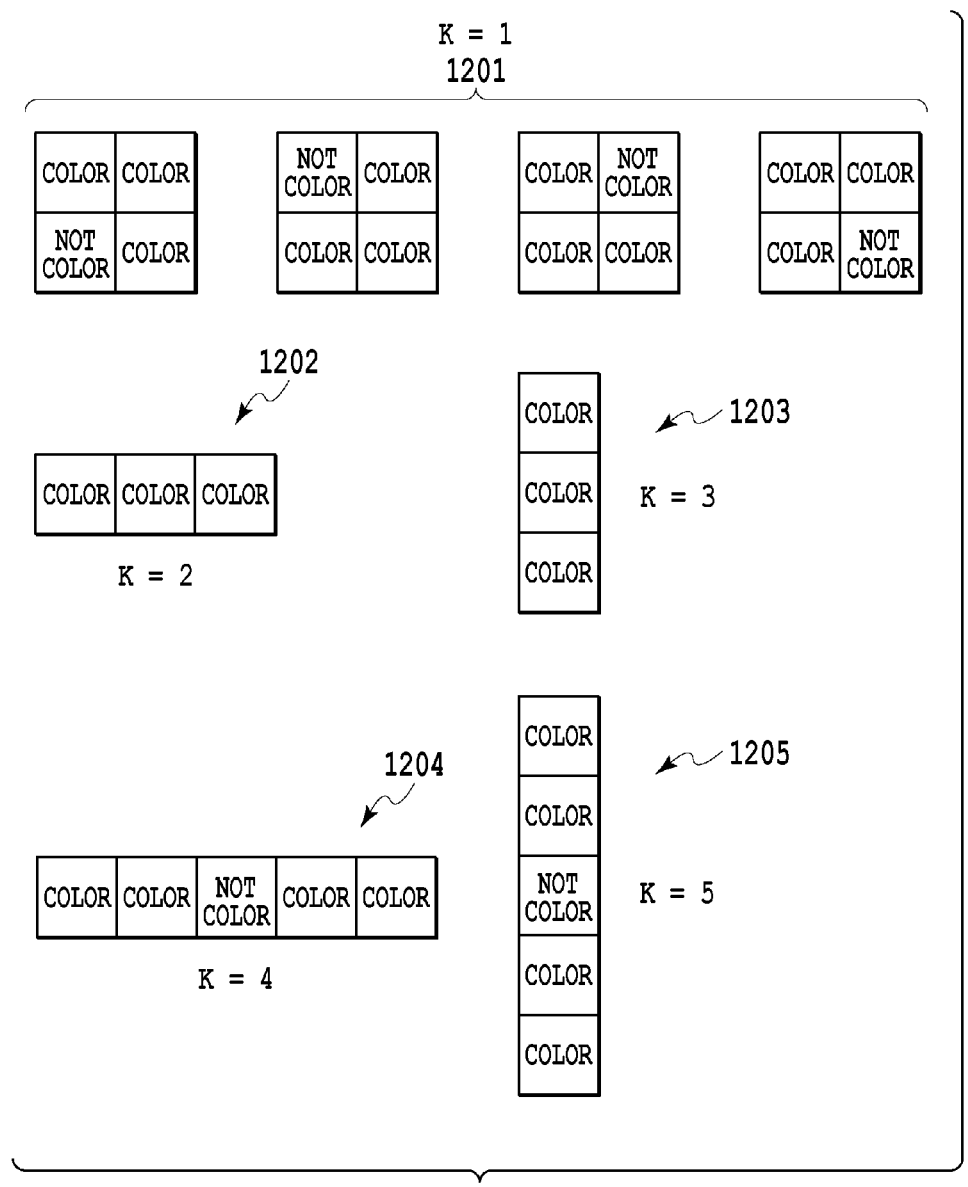
FIG. 12 is a view showing examples of color block group detection patterns in the embodiment.

FIG. 12 is a view showing examples of color block group detection patterns. A first color block group detection pattern 1201 is used to detect that one color block group is present in a case where three or more color blocks exist in a window of 2×2 blocks. A second color block group detection pattern 1202 is used to detect that one color block group is present in a case where three or more color blocks exist in a window of 3×1 blocks. A third color block group detection pattern 1203 is used to detect that one color block group is present in a case where three or more color blocks exist in a window of 1×3 blocks. A fourth color block group detection pattern 1204 is used to detect that one color block group is present in a case where four or more color blocks exist in a window of 5×1 blocks. A fifth color block group detection pattern 1205 is used to detect that one color block group exist in a case where four or more color blocks exist in a window of 1×5 blocks.

Using various detection patterns as described above enables complete detection of all of the color block groups. However, in a case where various detection patterns are used, some color block groups may be detected redundantly. The following operation is performed to prevent redundant counting of detection results for each of groups. First, the detection patterns are given first to fifth priorities, respectively. In this example, the first color block group detection pattern is given the highest priority. In a case where one color block is detected with a pattern with a higher priority and the counting is performed, no counting is performed even if the same color block is detected with a pattern with a lower priority. This enables complete detection of all of the color block groups by using detection patterns like those shown in FIG. 12.

Figure 13:
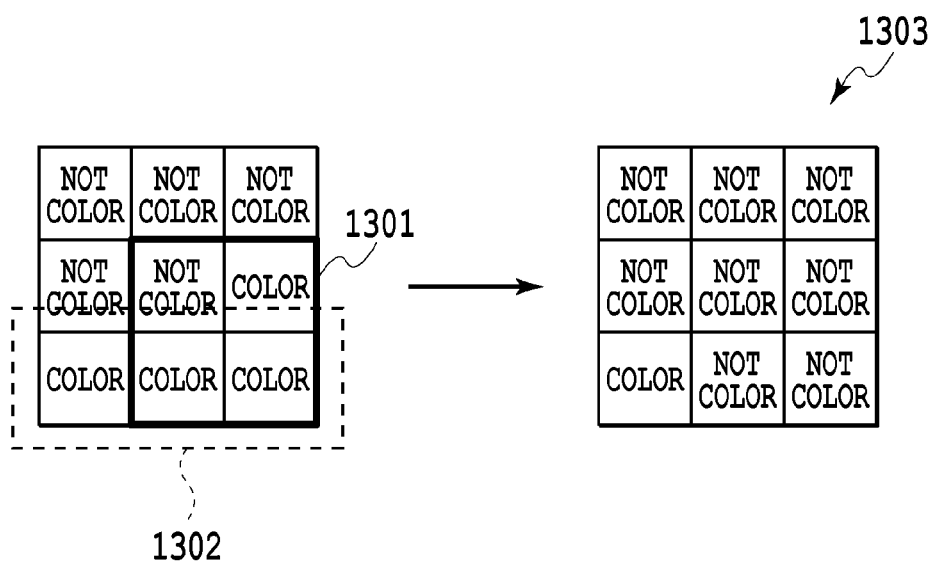
FIG. 13 is a view showing an example of color block counting in the embodiment.
Figure 14:
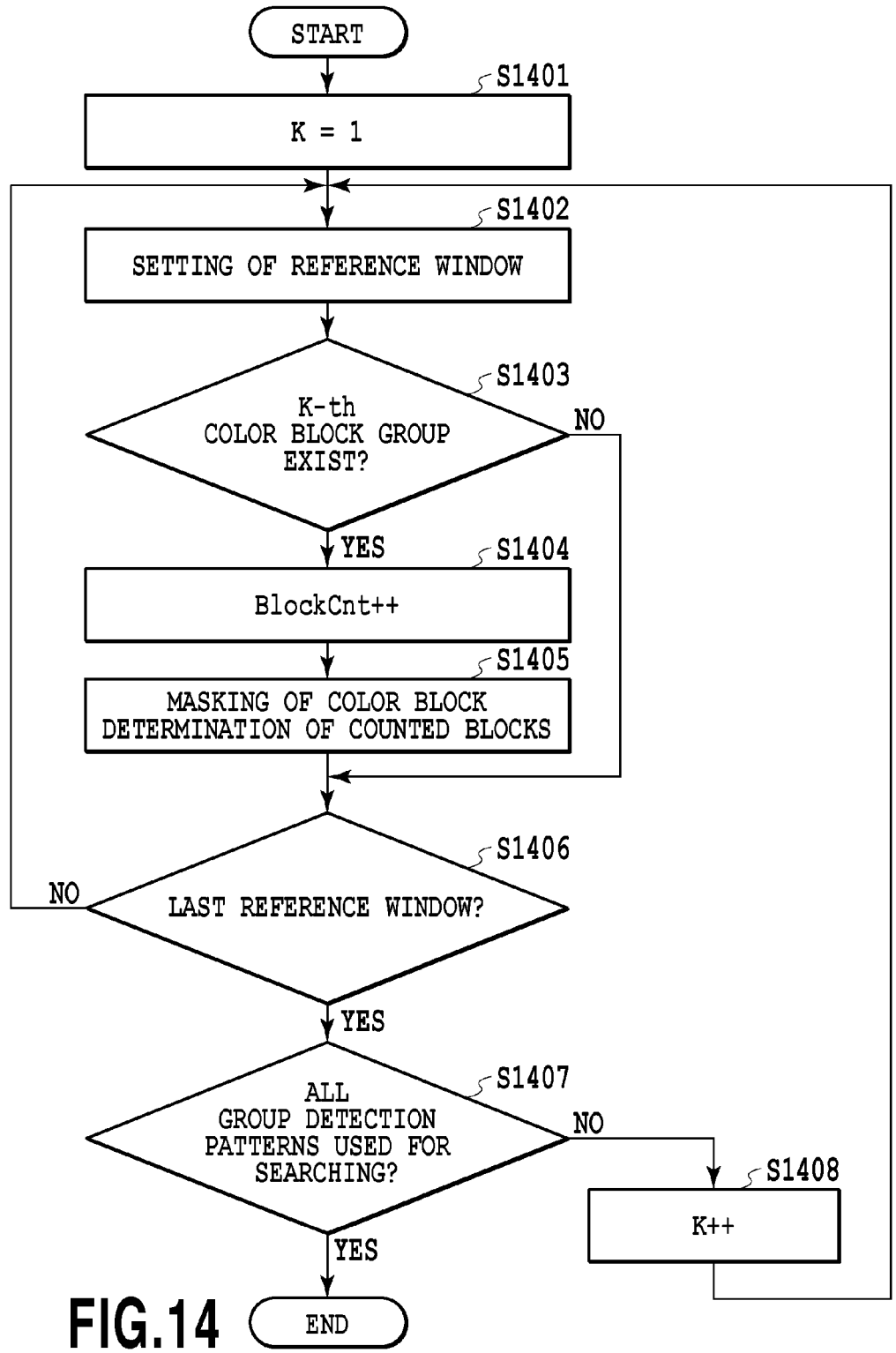
FIG. 14 is a flowchart showing a processing flow of color block group detection in the embodiment.

A more specific example of the color block group detection and color block count is described by using FIG. 13 and the flowchart of FIG. 14.

In step S1401, the color block counting unit 305 first sets a value "1" to "K" to detect color block groups matching the first color block group detection pattern. Note that K is a variable for identifying the color block group detection patterns from each other and is set to one of integers from 1 to 5. These values of K correspond respectively to the first to fifth color block group detection patterns shown in FIG. 12. In the following processing, handling of a block to be a target of the color block group detection processing is changed depending on the value of K.

In step S1402, the color block counting unit 305 sets a reference window in which color blocks in the scanned image are cut out in a size of a predetermined region. In this example, a reference window of at least 5×5 blocks is set to allow detection of color block groups by using the fourth and fifth color block group detection patterns. Then, the color block counting unit 305 counts the number of the color block groups in each of the reference windows.

In step S1403, the color block counting unit 305 searches the reference window set in step S1402 for a K-th color block group. In a case where step S1403 is executed for the first time, the color block counting unit 305 searches the reference window for a color block group which can be detected by using the first color block group detection pattern. In a case where there is a K-th color block group in the reference window, in step S1404, the color block counting unit 305 increments BlockCnt which is a color block group counter. Then, in step S1405, the color block counting unit 305 rewrites information on color blocks counted as a color block group to information indicating that the blocks are not color blocks. Specifically, the color block counting unit 305 rewrites information on color blocks in reference blocks matching the K-th color block group detection pattern to information indicating that the blocks are not color blocks. For example, assume a case where color blocks are arranged as shown in FIG. 13. Note that a region of 3×3 blocks is illustrated for simplification. In FIG. 13, there are a region 1301 matching the first color block group detection pattern and a region 1302 matching the second color block group detection pattern. In this stage, the color block counting unit 305 determines that the region 1301 is a color block group by using the first color block group detection pattern, and increments the color block group counter. Then, the color block counting unit 305 rewrites information on the blocks in the region matching the first color block group detection pattern to information indicating that the blocks are not color blocks, as in an example denoted by reference numeral 1303. For example, the color block counting unit 305 rewrites the information on the blocks in the region matching the first color block group detection pattern to information of monochrome blocks. In the next search processing, the color block counting unit 305 performs pattern matching by using the rewritten information. Redundant counting of color block groups for the same block can be thereby prevented in searching using the second color block group detection pattern.

Processing in steps S1403 to step S1405 is performed repeatedly for all of the blocks in the reference window. For example, in a case where there are multiple K-th color block groups in the reference window set in step S1402, the incrementing processing of step S1404 and the masking processing of step S1405 is performed for each of the multiple color block groups.

In step S1406, the color block counting unit 305 determines whether the searched reference window is the last window. Specifically, the color block counting unit 305 determines whether the detection of K-th color block groups has been performed for the entire document 204. In a case where the searched reference window is not the last window, the processing returns to step S1402, and a window position is set to the next reference position. In a case where the searched reference window is the last window, the processing proceeds to step S1407.

In step S1407, the color block counting unit 305 determines whether all of the patterns have been used to detect color block groups. Specifically, in this example, the color block counting unit 305 determines whether K is 5. In a case where all of the patterns have been used to detect color block groups, the color block counting operation is terminated. In a case where the color block counting unit 305 determines that not all of the patterns have been used to detect color block groups, the processing proceeds to step S1408, and K is set to K+1. Then, the processing returns to step S1402 and the window position is set to the first reference position.

By repeating the operations described above, color block patterns matching the first color block group detection pattern to the fifth color block group detection pattern are detected and the total number of the detected color block groups is recorded as BlockCnt. Moreover, it is possible to avoid redundant counting of color block groups already detected by using a pattern with a higher priority.

Although description is given of an example in which the first to fifth color block group detection patterns are used, the detection may be performed by using other patterns. Moreover, the number of patterns is not limited to five. In this case, a setting range of K, a setting range of the reference window, and the like can be changed as appropriate.

[Color/Monochrome Determination Unit]

Next, processing of the color/monochrome determination unit 306 is described. The color/monochrome determination unit 306 compares a threshold value Th4 and the color block group counter BlockCnt counted by the color block counting unit 305 with each other. In a case where the number of color block groups is greater than the threshold value Th4, the color/monochrome determination unit 306 determines that the document 204 is a color document.

In the embodiment, the color/monochrome determination is performed not based on simple consecutiveness of color blocks but based on a degree of matching between a pattern of color blocks and a predetermined pattern. Accordingly, it is possible to prevent a case where accuracy of the color/monochrome determination decreases depending on the shapes and arrangement of color contents and the like. Moreover, it is possible to improve accuracy of detecting small color contents such as letters of a small point size. Furthermore, it is possible to prevent a case of erroneously determining a document as a color document due to impurities included in a sheet of the document and color shift of a reading device.

Other Embodiments

In the aforementioned embodiments, an example in which a document is read by a flatbed scanner is described. However, the configuration of the present invention is not limited by this example and a configuration in which an automatic document feeder (ADF) is used may be employed. In the ADF, a document is conveyed by being held between the rollers. False color may occur due to slight shaking of the document in passing of the document to and from the rollers during the conveyance. Accordingly, in a case of using the ADF, color/monochrome determination invalid regions suitable for the ADF may be set.

Moreover, in the aforementioned embodiments, description is given of an example in which one photosensitive drum is provided and toners of various colors are developed on the photosensitive drum. However, the aforementioned color/monochrome determination processing can be performed also in a printing apparatus in which a photosensitive drum is provided for each color.

Moreover, in the aforementioned embodiments, description is given of an example in which the number of color block groups is counted up by performing pattern matching with the predetermined patterns. This method is preferable in that the monochrome/color determination can be performed irrespective of the shapes and arrangement of color contents. However, the present invention is not limited by the aforementioned embodiments. This is because the present invention can reduce the color shift and noises in the smoothing processing by the smoothing unit 301 and thereby prevent erroneous determination due to such color shift and noises. The present invention may be thus carried out, for example, in a mode in which the color block counting unit 305 counts the number of consecutive color blocks and the color/monochrome determination unit 306 determines that a scanned image is a color image in a case where the counted number is greater than a predetermined threshold value.

In the aforementioned embodiment, although description is given of an example in which color blocks are used, the present invention may be carried out in a mode in which a scanned image is determined to be a color image in a case where the number of color pixels included in the scanned image exceeds a predetermined threshold. Moreover, the present invention may be carried out in a mode in which determination is performed based on the consecutiveness of color pixels included in a scanned image and the scanned image is determined to be a color image in a case where the number of groups of consecutive color pixels exceeds a predetermined threshold value.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the present invention, appropriate color determination can be performed on a document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-120791, filed Jun. 11, 2014, which is hereby incorporated by reference herein in its entirety.

What is claimed is:

1. An image processing apparatus comprising:
one or more processors; and
a memory storing instructions which, when executed by the processor, cause the image processing apparatus to function as:
a specifying unit configured to specify pixels to be processed in a scanned image, the pixels to be processed being included in a target area including a target pixel and pixels in a vicinity of the target pixel;
a smoothing unit configured to smooth a pixel value of the target pixel by using pixels specified by the specifying unit; and
a determination unit configured to determine whether the target pixel is a color pixel or monochrome pixel based on the smoothed pixel value,
wherein a result of the determination by the determining unit is used for a process of determining whether the scanned image is a color image or a monochrome image, and
wherein the specifying unit, in a case where the target area includes a plurality of background areas which are not adjacent, specifies pixels which are between the background areas and are included in other than the background area in the target area, and does not specify pixels which are not between the background areas in the target area.

2. The image processing apparatus according to claim 1, wherein the target area is the area such that a length of the area in a sub-scanning direction of the scanned image is longer than a length of the area in a main scanning direction of the scanned image.

3. The image processing apparatus according to claim 1, wherein each position of the background areas in a sub-scanning direction of the scanned image are different, and each position of the background areas in a main-scanning direction of the scanned image are equal to each other.

4. The image processing apparatus according to claim 1, wherein the smoothing unit averages color values of the specified pixels to be used.

5. The image processing apparatus according to claim 1, wherein the smoothing unit performs the smoothing while weighting color values of the specified pixels to be used.

6. The image processing apparatus according to claim 5, wherein the smoothing unit uses a pixel between the background area and a center portion in a sub-scanning direction of the scanned image in the smoothing while setting a weight of the pixel smaller than a weight of the pixels to be used.

7. The image processing apparatus according to claim 1, wherein the determination unit determines that a pixel having R, G, and B values respectively within ranges is a background pixel, the ranges obtained by adding allowable widths respectively to R, G, and B values of a background portion, and determines that the background area is an area in which the background pixels are continuous.

8. The image processing apparatus according to claim 7, wherein the R, G, and B values of the background portion represent an achromatic color.

9. The image processing apparatus according to claim 1, wherein the number of the pixels used by the smoothing unit varies for each of target pixels.

10. An image processing method comprising:
a specifying step of specifying pixels to be processed in a scanned image, the pixels to be processed being included in a target area including a target pixel and pixels in a vicinity of the target pixel;
a smoothing step of smoothing a pixel value of the target pixel by using pixels specified in the specifying step; and
a determination step of determining whether the target pixel is a color pixel or monochrome pixel based on the smoothed pixel value,
wherein a result of the determination by the determining step is used for a process of determining whether the scanned image is a color image or a monochrome image,
wherein, in a case where the target area includes a plurality of background areas which are not adjacent, pixels which are between the background areas and are included in other than the background area are specified in the target area, and pixels which are not between the background areas are not specified in the target area, in the specifying step, and wherein at least one of the specifying step, the smoothing step, and the determination step is implemented by one or more processors and a memory.

11. A non-transitory computer readable storage medium storing a program which causes a computer to perform the image processing, the method comprising:
   a specifying step of specifying pixels to be processed in a scanned image, the pixels to be processed being included in a target area including a target pixel and pixels in a vicinity of the target pixel;
   a smoothing step of smoothing a pixel value of the target pixel by using pixels specified in the specifying step; and
   a determination step of determining whether the target pixel is a color pixel or monochrome pixel based on the smoothed pixel value,
   wherein a result of the determination by the determining step is used for a process of determining whether the scanned image is a color image or a monochrome image, and
   wherein, in a case where the target area includes a plurality of background areas which are not adjacent, pixels which are between the background areas and are included in other than the background area are specified in the target area, and pixels which are not between the background areas are not specified in the target area, in the specifying step.

* * * * *